United States Patent [19]
Heim et al.

[11] Patent Number: 5,857,731
[45] Date of Patent: Jan. 12, 1999

[54] VEHICLE DOOR WITH A TRIANGULAR MIRROR BRACKET FOR MOUNTING AN OUTSIDE MIRROR

[75] Inventors: Gunther Heim, Mainhausen; Rene Rack, Obertshausen; Jürgen Hock, Aschaffenburg; Armin Klein, Westerngrund, all of Germany

[73] Assignee: Wagon Automotive GmbH, Waldaschaff, Germany

[21] Appl. No.: 702,230

[22] Filed: Aug. 23, 1996

[30] Foreign Application Priority Data

Aug. 23, 1995 [DE] Germany .......................... 195 30 941.3

[51] Int. Cl.⁶ ......................................................... B60J 5/04
[52] U.S. Cl. ..................................... 296/146.2; 296/146.5; 47/502; 248/475.1
[58] Field of Search .............................. 296/146.1, 146.2, 296/146.5, 201; 49/502; 359/871; 248/224.7, 475.1, 479

[56] References Cited

U.S. PATENT DOCUMENTS 4,322,132  3/1982  Derr ..................................... 359/871 X

FOREIGN PATENT DOCUMENTS

| 476351 | 3/1992 | European Pat. Off. ................. 49/502 |
| 73726 | 6/1978 | Japan ........................................ 49/502 |
| 415 | 1/1983 | Japan ........................................ 49/502 |
| 0120540 | 7/1984 | Japan ...................................... 359/871 |
| 188227 | 8/1986 | Japan ........................................ 49/502 |
| 403208726 | 9/1991 | Japan ........................................ 49/502 |
| 5-124439 | 5/1993 | Japan . |
| 405254345 | 10/1993 | Japan ................................. 296/146.5 |
| 6-64445 | 3/1994 | Japan . |
| 406137022 | 5/1994 | Japan ........................................ 49/502 |
| 406137024 | 5/1994 | Japan ........................................ 49/502 |

*Primary Examiner*—Dennis H. Pedder
*Attorney, Agent, or Firm*—Venable; George H. Spencer; Norman N. Kunitz

[57] ABSTRACT

A vehicle door, which can be attached with hinges to a motor vehicle, wherein the vehicle door (1; 33) has an inside wall (8), an outside wall and window channel profiles (2; 18; 28) and wherein a triangular mirror bracket (3; 13; 25; 34) is provided above the outside wall for mounting the outside mirror (4). In order that the triangular mirror bracket (3; 13; 25; 34) can be installed quickly and easily in the vehicle door (1) and can be replaced easily during subsequent repairs, the triangular mirror bracket (3; 13; 25; 34) is provided on its underside (5; 16) with a pin (6; 17; 26), which is inserted into a recess (7; 21; 27) of a bearing structural component (22; 28) of the door (1) to mount the triangular mirror bracket (3; 13; 25; 34) to the vehicle door (1; 33).

3 Claims, 4 Drawing Sheets

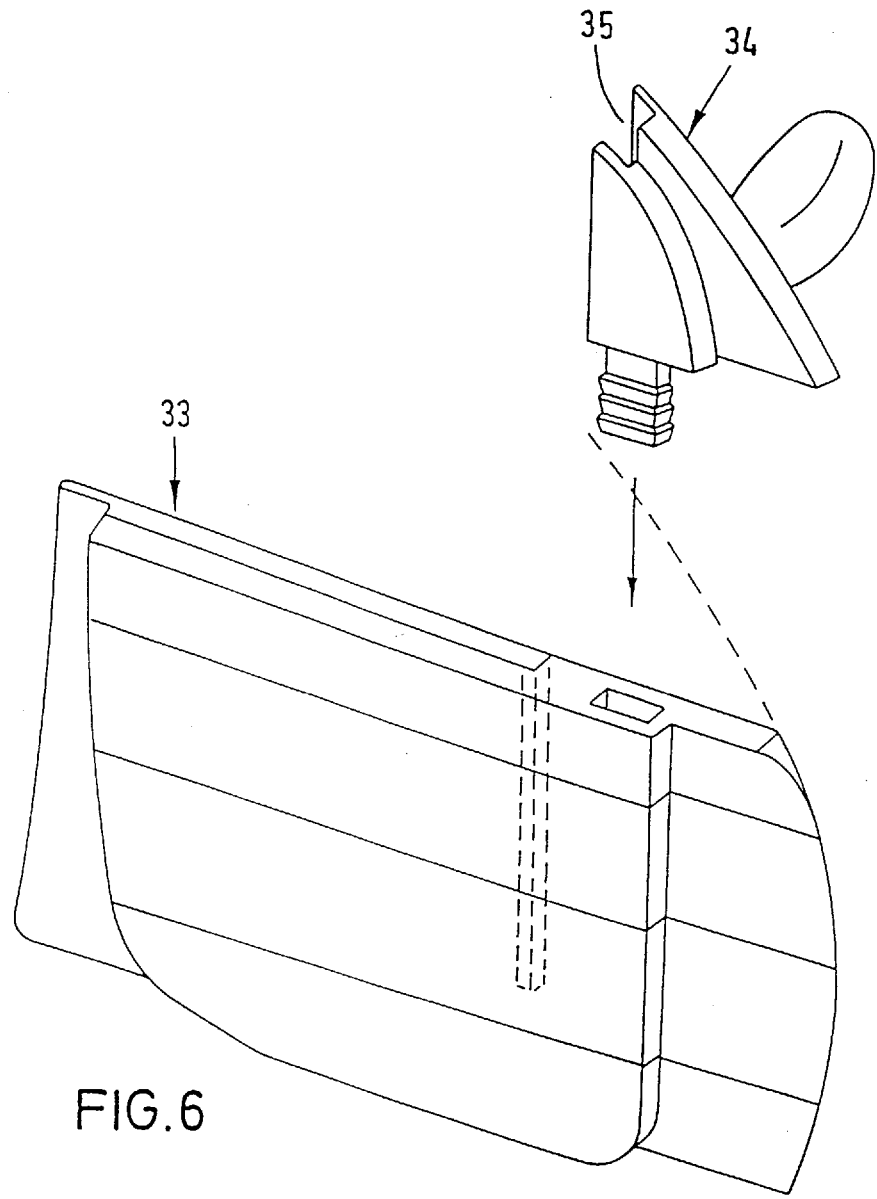

VEHICLE DOOR WITH A TRIANGULAR MIRROR BRACKET FOR MOUNTING AN OUTSIDE MIRROR

REFERENCE TO RELATED APPLICATIONS

This application claims the priority of German application Serial No. DE 19530941.3, filed Aug. 23, 1995, which is incorporated herein by reference.

BACKGROUND OF THE INVENTION

The invention relates to a vehicle door with a triangular mirror bracket for mounting an outside mirror. More particularly, the present invention relates to a vehicle door, which can be attached with hinges to a motor vehicle, wherein the door has an inside wall, an outside wall, and window channel profiles for a window, and wherein a triangular mirror bracket with an outside mirror is disposed above the outside wall for mounting the outside mirror to the door.

On vehicles currently in use, the respective outside mirror installed on vehicle doors is fastened to a triangular mirror bracket, which is generally located in the frontal section of the door, above the outside or inside door wall. In conventional punch-pressed doors, the respective sheet-metal portion of the door provides a bearing surface for mounting the triangular mirror bracket to the door.

One disadvantage of such vehicle doors is, above all, that a fastening of the triangular mirror bracket, e.g., during the initial assembly, or a replacement of the triangular mirror bracket during repairs, for example, is relatively time-consuming. Also, a relatively high amount of punchings accumulate during the punch-pressing of the corresponding sheet metal doors because of the unfavorable contours of the door.

It is the object of the invention to provide a vehicle door of the particular type for which the triangular mirror bracket can be installed quickly and easily in the door. In addition, the triangular mirror bracket must be adaptable to a wide variety of design specifications and easy to replace during later repairs.

SUMMARY OF THE INVENTION

The above object generally is achieved according to the present invention by a vehicle door, which can be attached with hinges to a motor vehicle, which comprises: an inside wall, an outside wall, window channel profiles for a window, and a triangular mirror bracket with an outside mirror disposed above the outside wall for mounting the outside mirror to the door; and wherein the triangular mirror bracket has a pin disposed on its underside, with the pin being inserted into a recess formed in a bearing structural component of the door to mount the triangular mirror bracket to the vehicle door. Additional and particularly advantageous embodiments of the invention are disclosed in the dependent claims.

The invention is based on the idea that the triangular mirror bracket has a pin on its underside, with the pin being arranged, preferably such that it interlocks, in a corresponding recess of a structural member of the vehicle door. The pin can have a square, rectangular or L-shaped cross section. Moreover, the pin can be formed as a solid or a hollow part.

Such a structural design makes it possible to install and replace the triangular mirror bracket quickly and easily by simply inserting it, e.g., into a hollow section of a framed door. If necessary and after being inserted, the triangular mirror bracket is secured in this position with traditional fastening means, e.g., screws. In order to remove the triangular mirror bracket, it is then only necessary to release the respective fastening means and pull the triangle from the hollow profile.

Insofar as the vehicle door is a punch-pressed door, the pin for the triangular mirror bracket can engage in a respectively raised section of the inside wall.

For a particularly stable attachment of the triangular mirror bracket to the door, it has proven advantageous to mount it also to the window channel. This can be done by fastening the triangular mirror bracket either to the window channel profile directly, or by letting it enclose the profile completely or partially.

There is also the option of designing the triangular mirror bracket such that it constitutes a component or portion of the window channel.

The triangular mirror bracket can be designed as one piece or consist of several parts, wherein the complete structural member should be preassembled such that it can be delivered as a tested module for the final door assembly.

Insofar as the window channel profile or the door frame with integrated window channel has a cover plate as sealing element, it can also be integrated into the triangular mirror bracket.

Further details and advantages of the invention are described below with a number of exemplary embodiments, which are explained with the aid of the drawing figures.

BRIEF DESCRIPTION OF THE DRAWINGS

FIG. 6 is a perspective view of a door according to the invention for a convertible where the triangular mirror bracket forms a part of the window channel.

DETAILED DESCRIPTION OF THE PREFERRED EMBODIMENT

Figure 1:
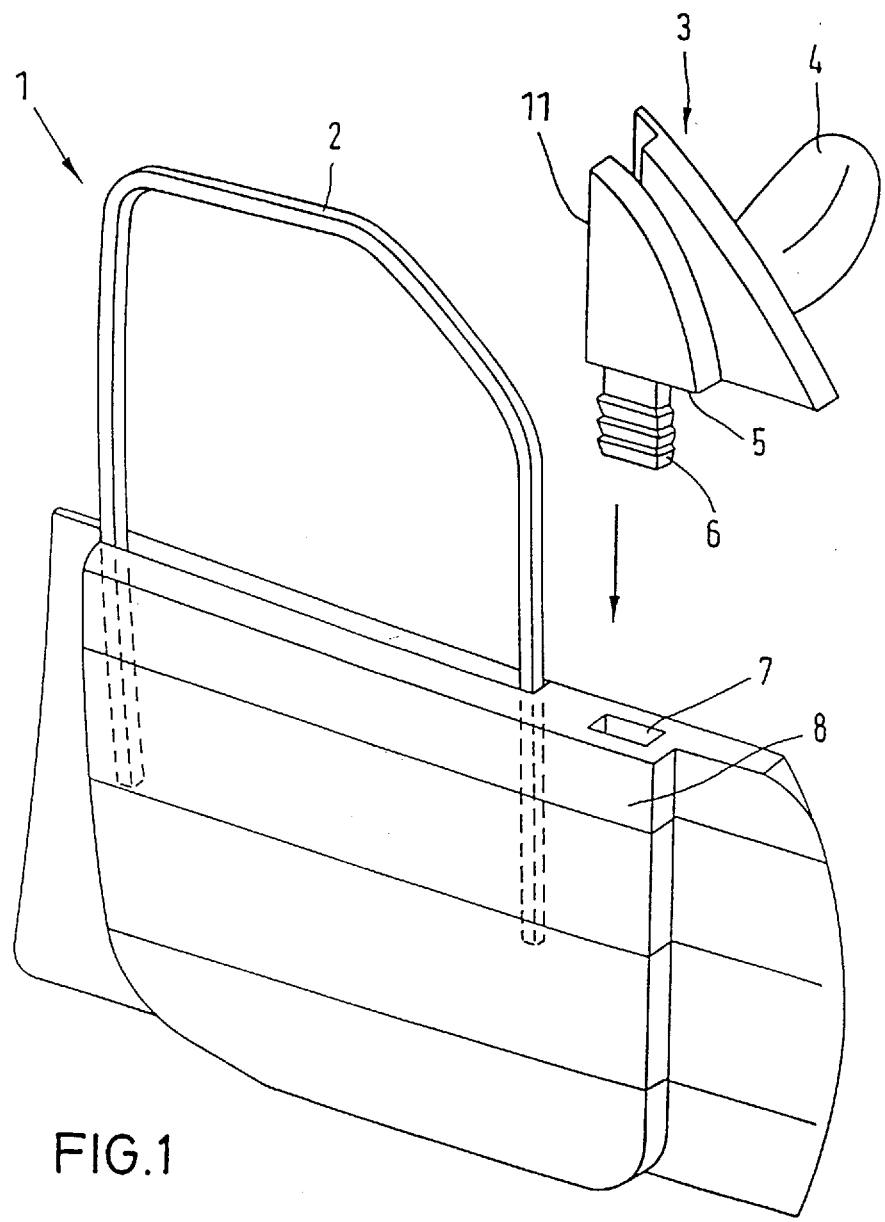
FIG. 1 is a perspective view of a vehicle door according to a first embodiment of the invention, with a separately displayed insertable triangular mirror bracket with a mirror.

Referring to FIG. 1, there is shown a punch-pressed door 1 with an inserted frame 2 for a door window panel (window channel profile) and an insertable triangular mirror bracket 3 for mounting an outside mirror 4. In order to mount the triangular mirror bracket 3 to the vehicle door 1, the triangular mirror bracket 3 is provided on its underside 5 with a pin 6, which engages form-fittingly in a corresponding recess 7 disposed in the upper surface of the inside wall 8 of the punch-pressed door 1. In particular the recess 7 is formed in a hollow structured profiled member provided in the upper portion of the inside wall to stiffen or strengthen the inside wall 8.

After pin 6 of triangular mirror bracket 3 is inserted into recess 7, pin 6 is secured in this position with a screw, which is not shown in FIG. 1 for reasons of clarity.

In addition to or as alternative, triangular mirror bracket 3 can be attached, e.g., also with screws to the window channel profile 2 with its side 11 which faces the window channel profile 2. Preferably, as shown, the side or edge of the triangular mirror bracket is provided with a groove or channel which partially surrounds the adjacent portion of the window channel profile 2.

Figure 2:
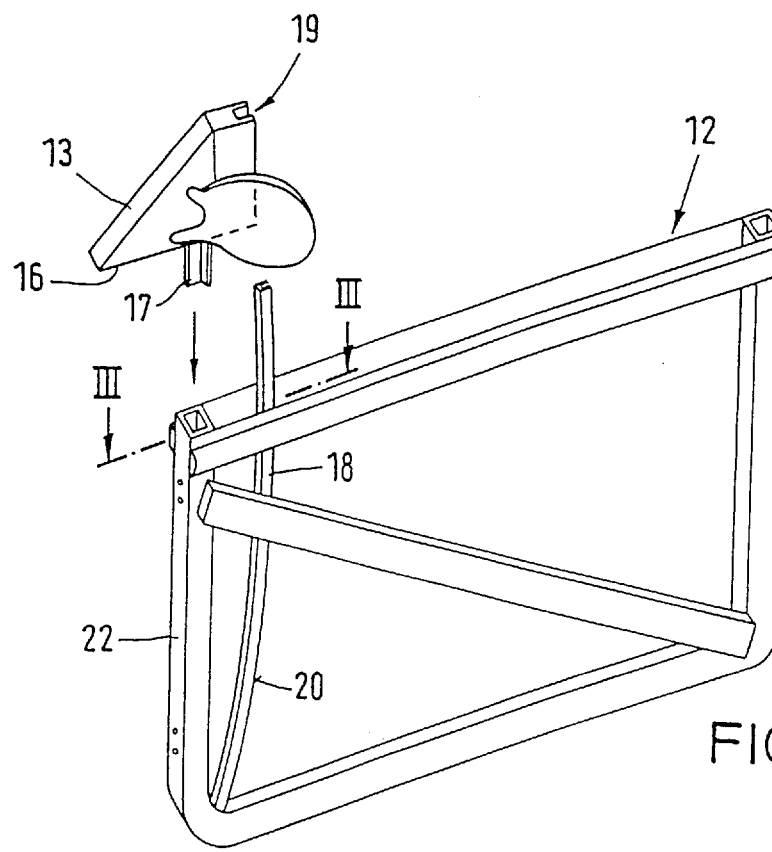
FIG. 2 is a perspective view of a further embodiment of the invention showing the contour frame of a framed door before the triangular mirror bracket is inserted.
Figure 3:
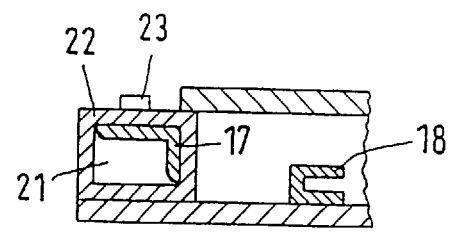
FIG. 3 is an enlarged cross section through the contour frame shown in FIG. 2, along the line III—III after insertion of the triangular mirror bracket into the respective hollow profile or frame section.

In the vehicle door shown in FIGS. 2 and 3, numeral 12 stands for the contour frame of a framed door, which has a triangular mirror bracket 13 attached at the front of its upper edge. An L-shaped pin 17 (FIG. 3) is fastened to the underside 16 of the triangular mirror bracket 13. In addition, the triangular mirror bracket 13 has a profiling or groove 19 on the side facing the window channel profile 18, which is selected such that the triangular mirror bracket 13 partially encloses window channel profile 18. In this case, the window channel profile 18 remains open on the side 20 facing the respective window pane, so that the channeling of the respective (not shown) window pane is ensured.

The complete mirror is slipped onto the door frame to fasten triangular mirror bracket 13 to the contour frame 12, meaning that pin 17 of triangular mirror bracket 13 is inserted into a recess 21 (FIG. 3) of a hollow profiled member 22 of the frame 12 and then is secured with a screw 23.

Figure 4:
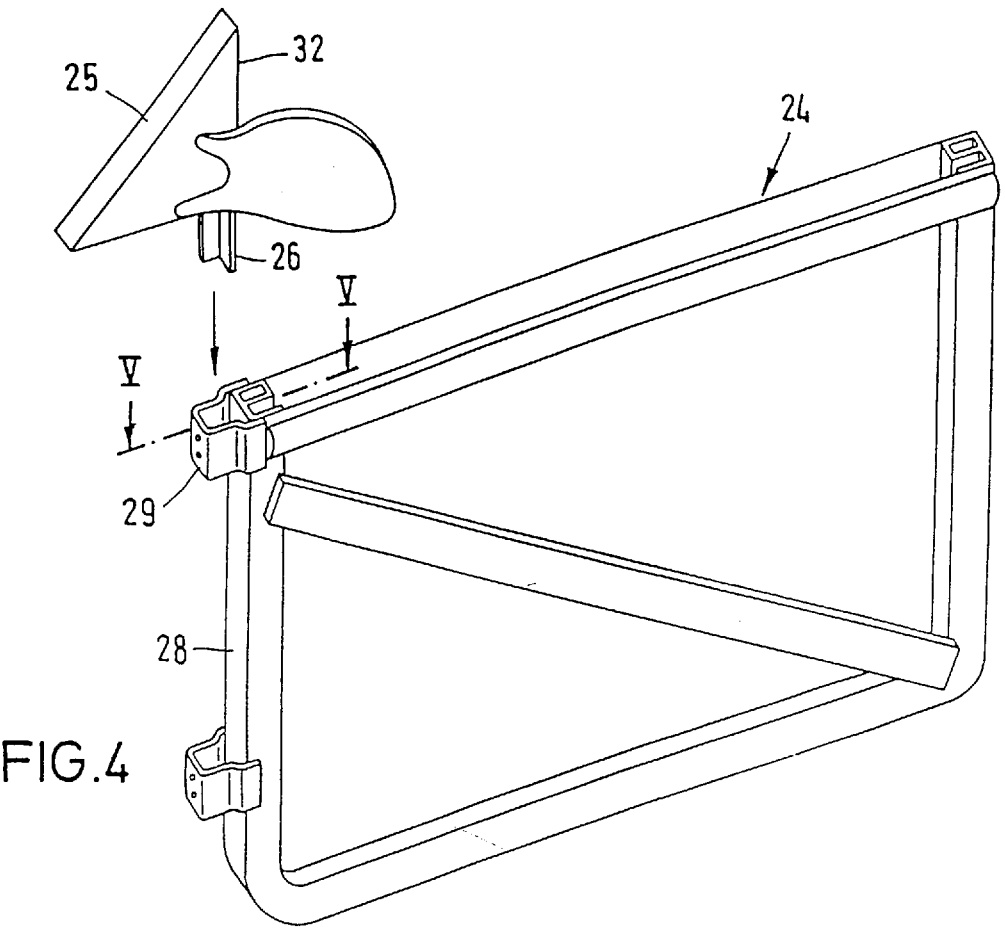
FIG. 4 is a perspective view of another exemplary embodiment of a framed door, where the mirror triangle bracket is arranged such that it can be inserted through a recess, defined by a door hinge bracket.
Figure 5:
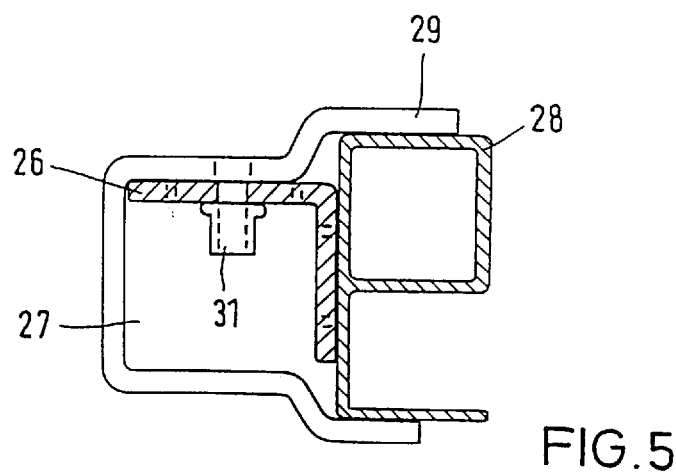
FIG. 5 is an enlarged cross section through the contour frame shown in FIG. 4, along the line as V—V, there and following the insertion of the mirror triangle bracket into the respective recess.

FIGS. 4 and 5 show the contour frame 24 of another framed door, where a triangular mirror bracket 25 is inserted into a recess 27 with a pin 26 (FIG. 5), which is also L-shaped. Recess 27 here is formed by the space between a hollow profiled member 28 of contour frame 24 and a generally U-shaped upper attachment bracket 29 for a vehicle door hinges (not shown). With the displayed contour frame 24, the hollow profiled member 28 simultaneously serves as a window channel profile for the portion of the window within the door in that a part of the member 20 is open in a direction toward the interior of the door.

In order to fasten the triangular mirror bracket 25 to the contour frame 24, the pin 26 of triangular mirror bracket 25 is inserted into the recess 27 and is secured to the attachment bracket 29 with a screw 31 as can be seen in FIG. 5.

FIG. 6 shows the vehicle door 33, for example a convertible, which does not have an extended window channel wherein the triangular mirror bracket 34 forms a component of the window channel. For this purpose, the triangular mirror bracket has a U-shaped recess 35 on its side or surface facing the window and into which the window extends when it is raised.

The invention now being fully described, it will be apparent to one of ordinary skill in the art that any changes and modifications can be made thereto without departing from the spirit or scope of the invention as set forth herein.

What is claimed:

1. A vehicle door, which can be attached with hinges to a motor vehicle, comprising: an inside wall, an outside wall, window channel profiles for a window and a triangular mirror bracket, with an outside mirror disposed above the outside wall for mounting the outside mirror to the door; wherein, said triangular mirror bracket has a pin disposed on its underside, with said pin being inserted into a recess formed in a bearing structural component of the door to mount the triangular mirror bracket to the vehicle door; wherein said door is provided with attachment brackets for hinges for the vehicle door, with at least an upper one of said attachment brackets enclosing said recess with an edge of the vehicle door; and wherein said pin of said triangular mirror bracket is inserted into said recess enclosed by said attachment bracket for the vehicle door hinge.

2. A vehicle door according to claim 1, further comprising additional fastening means for securing said pin in said recess of said bearing structural component of said door.

3. A vehicle door according to claim 1, wherein said pin of said triangular mirror bracket has one of a rectangular and an L-shaped cross section.

* * * * *